May 18, 1926.
F. W. BURGER ET AL
SPRING SUPPORTING AND ATTACHING MEANS FOR VEHICLES
Filed Dec. 31, 1923
1,584,977
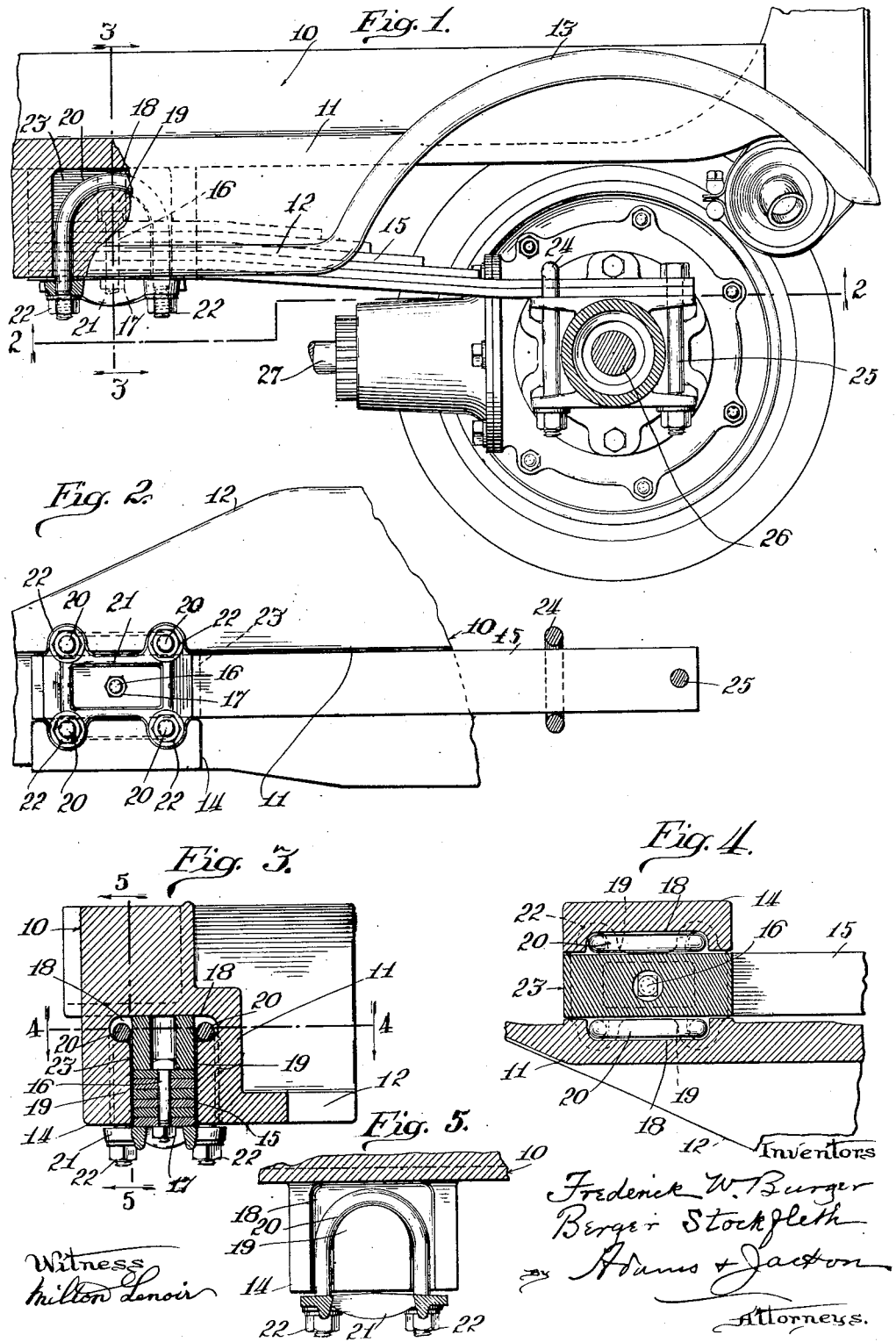

Patented May 18, 1926.

1,584,977

UNITED STATES PATENT OFFICE.

FREDERICK W. BURGER, OF NILES, AND BERGER STOCKFLETH, OF BERRIEN SPRINGS, MICHIGAN, ASSIGNORS TO CLARK TRUCTRACTOR COMPANY, OF BUCHANAN, MICHIGAN, A CORPORATION OF MICHIGAN.

SPRING SUPPORTING AND ATTACHING MEANS FOR VEHICLES.

Application filed December 31, 1923. Serial No. 683,721.

This invention relates to improvements in the means for securing in place that end of an ordinary leaf spring that is connected with the framework of a vehicle, such a spring being interposed at each side of the vehicle between the rear axle thereof and said framework. It is the object of the invention to provide a construction that will permit such a spring, with the various leaves thereof already connected together, to be easily and quickly placed in position, and when so placed to be very firmly and securely held to the framework. The invention is primarily intended for use in connection with the securing in place of such springs to the framework of a motor-driven vehicle of the type known as shop tractors that are employed in and about shops, railway stations and other places for pushing or pulling from place to place trucks used for the transportation of articles of various kinds, and in the drawing the invention is illustrated in connection with a portion of the framework and some of the other parts of such a machine.

In the drawing,—

Fig. 1 is a side elevation of so much of the rear part of a portion of a motor-driven vehicle as is necessary to illustrate the invention—some parts being in section, and a portion of the framework of the vehicle being broken away;

Fig. 2 is an inverted plan or bottom view of the means for securing the spring to the framework, the securing means for the other end of the spring being shown in section—the section being taken at line 2—2 of Fig. 1;

Fig. 3 is a vertical section taken at line 3—3 of Fig. 1;

Fig. 4 is a horizontal section taken at line 4—4 of Fig. 3; and

Fig. 5 is a vertical section taken at line 5—5 of Fig. 3.

Referring to the several figures of the drawing,—10 indicates the main or body portion of the supporting frame of the tractor, which has at its outer side a heavy vertical depending flange portion 11, (see Fig. 3) the frame thus when viewed as in cross-section being angular in appearance. Extending out from the flange member 11 is a lateral portion that constitutes a step 12 which merges into a curved fender 13. The parts of the frame so far mentioned are preferably formed integral, as here shown, although in the broader aspect of the invention they may be otherwise formed. At the desired point on the frame where a spring is to be secured, as hereinafter described, there is provided a short, heavy wall member 14 whose outer face is preferably a continuation of the outer face of said member 10, and whose inner face is spaced from the inner face of the flange 11 sufficiently to form a channel between said members, open at the bottom, which is adapted to receive the end portion of the leaf spring referred to. It is to be understood, of course, that inasmuch as a leaf spring is provided at each side of the machine, the construction at each side will be the same.

The supporting spring for each side of the machine is, as here shown and as is common practice, made up of a plurality of long heavy leaves laid one upon the other, the spring as a whole being indicated by 15. The leaves that together form a complete spring are to be secured together, and in the construction shown the securing means here provided is a bolt 16 that passes through the leaves near their forward ends, and upon the lower end of which is screwed a nut 17. The inner faces of the frame flange 11 and the oppositely located wall member 14 are each formed with a recess 18 of a size and shape to allow a U-bolt to be received therein, thereby forming saddle blocks 19 that protrude at opposite sides of the channel, and that approximately conform to the shape of the U-bolts, and on top of which said bolts rest, as clearly shown in Fig. 5. The two U-bolts referred to are indicated by 20. Their lower ends extend down sufficiently to pass through and project beyond a clamping plate 21 that bridges the channel between the flange 11 and the wall 14, and is held in place by nuts 22 that are screwed up on the lower ends of the bolts 20 and against the lower face of the plate. The upper surface of the plate 21 is preferably slightly beveled laterally toward its two side margins, as best shown in Fig. 5, in order that a more firm engagement may be had by the plate against the under surface of the spring 15 that rests upon such plate. Owing to the fact that the flange 11 of the frame will ordinarily be wider than the thickness of the assembled leaves that form the spring 15, there is provided a spacing block or filler member 23 between the spring and the lower surface of the frame member 10, such spacing or filler member being of a size to hold the spring tightly between it and the plate 21 when the nuts 22 on the U-bolts 20 are tightened up, and, as shown in Fig. 3, this spacing or filler member has a central opening therethrough of a size and shape to receive the head of the bolt 16. Such member 23 also aids in holding the U-bolts 20 in position on their respective saddle blocks 19, as will be apparent from an inspection of Fig. 3.

The rear ends of the lower leaves of the spring 15 are connected with the rear axle of the tractor in any ordinary manner, as for example, as shown in Fig. 1, wherein a U-bolt 24 and a straight bolt 25 are employed in connection with suitable clamping blocks secured around the axle. The rear axle referred to is indicated by 26 and is driven by means of a propeller shaft, a small portion of which is shown at 27, and which in turn is connected with the axle by any ordinary means and driven in any usual way from the motor carried on the frame 10. Such driving means, however, form no part of the present invention, and are not deemed necessary to be shown.

When the springs are to be attached to the frame, such frame is preferably in a reversed or turned over position, and when in that position the two U-bolts are slipped into place over their respective saddle blocks 19. The filler or spacer block 23 is then dropped into place, after which the bolted-together spring is inserted in the channel between the parts 11 and 14 so that it rests upon such filler block or spacer. The bridging plate 21 is then applied over the projecting ends of the U-bolts 20 and the nuts 22 screwed down tightly so as to force such plate into very tight engagement with the spring. The operation of securing the forward end of the spring in place is thus very quickly and easily accomplished, and when in place and secured it will be very firmly connected with the framework of the machine, being not only held pressed upwardly against such framework, but securely braced against any possible lateral movement by the opposed flange 11 and wall member 14. Furthermore, as the U-bolts 20 are parallel with the spring which extends transversely of the recesses 18, the spring serves to hold said bolts in their respective recesses. Obviously our invention may be used in connection with other forms of leaf springs than that illustrated, and the claims are therefore to be construed accordingly.

What we claim as our invention and desire to secure by Letters Patent, is—

1. The combination of a vehicle frame having a spring-receiving channel, saddle blocks at opposite sides of said channel, a spring disposed between said saddle blocks, and means cooperating with said saddle blocks to clamp the spring to the frame.

2. The combination of a vehicle frame having a spring-receiving channel, a spring in said channel, U-bolts at opposite sides of said spring and substantially parallel therewith, and means cooperating with said U-bolts to secure the spring to the frame.

3. The combination of a vehicle frame having a spring-receiving channel open at the bottom, saddle blocks at opposite sides of said channel, a spring in said channel between said saddle blocks, U-bolts mounted on said saddle blocks in parallel relation with the spring, and means cooperating with said U-bolts to secure the spring to the frame.

4. The combination of a vehicle frame having a spring-receiving channel open at the bottom, saddle blocks at opposite sides of said channel, U-bolts mounted on said saddle blocks, a spring disposed between said U-bolts, and a clamping plate secured on said U-bolts beneath said spring.

5. The combination of a vehicle frame having a spring-receiving channel, recesses at opposite sides of said channel adapted to receive U-bolts disposed in substantial parallelism with the spring, a spring in said channel between said U-bolts, and means cooperating with said U-bolts to secure the spring to the frame.

6. The combination of a vehicle frame having a spring-receiving channel, recesses at opposite sides of said channel adapted to receive U-bolts disposed in substantial parallelism with the spring, a spring in said channel between said U-bolts, and a clamping plate extending across the channel under said spring and cooperating with the U-bolts to clamp the spring to the frame.

7. In a vehicle, the combination with a frame having a depending flange and a depending wall member spaced from said flange, said flange and wall member each having a recess in its inner face forming a protruding block on such face, a U-bolt located in each recess and resting on the block formed thereby, a spring lying between said blocks, and means carried by said U-bolts for supporting said spring.

8. In a vehicle, the combination with a frame having a depending flange and a depending wall member spaced from the flange, said flange and wall member each having a recess in its inner face forming a protruding block on such face, a U-bolt located in each recess and resting on the block formed thereby, a plate carried by said U-bolts below the said flange and wall member and bridging the space between them, a spring resting on said plate, and a spacing block located over said spring.

9. In a vehicle, the combination with a frame having a depending flange and a depending wall member spaced from the flange, a leaf spring, a bolt securing the several elements of said spring together, the bolted-together portion of said spring being located between the said flange and wall member, a spacing block located over said spring and having an opening into which the said bolt projects, bolts lying at opposite sides of said spring and extending below and connected with the said flange and wall member, a plate carried by said last-named bolts and extending under and supporting said spring, and nuts on said last-named bolts for forcing said plate against said spring.

FREDERICK W. BURGER.
BERGER STOCKFLETH.